(12) United States Patent
Gao et al.

(10) Patent No.: US 12,457,315 B2
(45) Date of Patent: Oct. 28, 2025

(54) LIGHT FIELD DISPLAY APPARATUS

(71) Applicant: BOE TECHNOLOGY GROUP CO., LTD., Beijing (CN)

(72) Inventors: Jian Gao, Beijing (CN); Fang Cheng, Beijing (CN); Qingxun Zhang, Beijing (CN); Jinye Zhu, Beijing (CN); Tao Hong, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 876 days.

(21) Appl. No.: 17/762,112

(22) PCT Filed: May 8, 2021

(86) PCT No.: PCT/CN2021/092410
§ 371 (c)(1),
(2) Date: Mar. 21, 2022

(87) PCT Pub. No.: WO2021/258873
PCT Pub. Date: Dec. 30, 2021

(65) Prior Publication Data
US 2022/0377311 A1    Nov. 24, 2022

(30) Foreign Application Priority Data

Jun. 23, 2020    (CN) .......................... 202010580943.1

(51) Int. Cl.
*H04N 13/307*    (2018.01)
*H04N 13/322*    (2018.01)

(52) U.S. Cl.
CPC ......... *H04N 13/307* (2018.05); *H04N 13/322* (2018.05)

(58) Field of Classification Search
CPC .......................... H04N 13/307; H04N 13/322
See application file for complete search history.

(56) References Cited

U.S. PATENT DOCUMENTS

2017/0205877 A1    7/2017    Qin
2021/0041718 A1    2/2021    Balogh
(Continued)

FOREIGN PATENT DOCUMENTS

CN    104914575 A    9/2015
CN    107529054 A    12/2017
(Continued)

OTHER PUBLICATIONS

Office Action dated Oct. 14, 2021 and Search Report dated Sep. 30, 2021, issued in counterpart CN Application No. 202010580943.1, with English Machine Translation. (14 pages).

*Primary Examiner* — Wen Huang
(74) *Attorney, Agent, or Firm* — WHDA, LLP

(57) ABSTRACT

A device for optical-field displaying includes: a display screen and a lens unit provided on a light exiting side of the display screen; the lens unit includes a plurality of lenses arranged in an array; the display screen is provided on a focal plane of the plurality of lenses; the display screen includes a first substrate and a second substrate that match; the first substrate is a light-exiting-side substrate, the second substrate includes a plurality of pixel islands arranged in an array; the plurality of pixel islands correspond to the plurality of lenses; a view region formed by light rays emitted by the sub-pixels of the pixel islands and propagated via the corresponding lenses to a human eye is smaller than or equal to a half-pupil region, and light rays of different viewpoints emitted by different sub-pixels of the pixel islands enter different cone cells via the lenses.

12 Claims, 9 Drawing Sheets

(56) References Cited

U.S. PATENT DOCUMENTS

| | | | |
|---|---|---|---|
| 2021/0063737 A1* | 3/2021 | Ling | .................... G02B 27/123 |
| 2021/0337182 A1 | 10/2021 | Wang et al. | |
| 2021/0405368 A1 | 12/2021 | Gao | |
| 2022/0146853 A1 | 5/2022 | Gao et al. | |

FOREIGN PATENT DOCUMENTS

| | | | |
|---|---|---|---|
| CN | 108196374 A | 6/2018 | |
| CN | 108803024 A | 11/2018 | |
| CN | 110402412 A | 11/2019 | |
| CN | 110488494 A | 11/2019 | |
| CN | 110908134 A | 3/2020 | |
| CN | 111175990 A | 5/2020 | |
| CN | 111624784 A | 9/2020 | |
| EP | 3128752 A1 | 2/2017 | |
| KR | 20120095217 A | 8/2012 | |
| WO | 2019/155243 A1 | 8/2019 | |

\* cited by examiner

LIGHT FIELD DISPLAY APPARATUS

CROSS REFERENCE TO RELEVANT APPLICATIONS

The present application is a national stage application, filed under 35 U.S.C. § 371, of International Patent Application No. PCT/CN2021/092410, filed on May 8, 2021, which claims the priority of the Chinese patent application filed on Jun. 23, 2020 before the Chinese Patent Office with the application number of 202010580943.1 and the title of "LIGHT FIELD DISPLAY APPARATUS", which is incorporated herein in its entirety by reference.

TECHNICAL FIELD

The present disclosure relates to the technical field of displaying, and particularly relates to a device for optical-field displaying.

BACKGROUND

The human eyes, when observing the real world, rely on the binocular parallax to generate the stereoscopic vision. Based on that principle, researchers have developed 3D displaying devices based on the parallax, such as a Virtual Reality (VR) displaying device.

SUMMARY

The embodiments of the present disclosure provide a device for optical-field displaying.

The embodiments of the present disclosure employ the following technical solutions:

In an aspect, there is provided a device for optical-field displaying, wherein the device comprises: a display screen and a lens unit that is provided on a light exiting side of the display screen;
- the lens unit comprises a plurality of lenses that are arranged in an array;
- the display screen is provided on a focal plane of the plurality of lenses;
- the display screen comprises a first substrate and a second substrate that match;
- the first substrate is a light-exiting-side substrate, the second substrate comprises a plurality of pixel islands that are arranged in an array, and each of the pixel islands comprises at least one sub-pixel;
- the plurality of pixel islands correspond to the plurality of lenses; and
- a view region formed by light rays that are emitted by the sub-pixels of the pixel islands and propagated via the corresponding lenses to a human eye is smaller than or equal to a half-pupil region, and light rays of different viewpoints that are emitted by different sub-pixels of the pixel islands enter different cone cells via the lenses.

Optionally, the lenses are spherical lenses, and the plurality of lenses are closely arranged; and an aperture D of the lenses satisfies:

$$D \geq 2L\tan\left(\frac{N\varepsilon}{120}\right)°;$$

wherein L is an actual watching distance, N is a quantity of the viewpoints, N≥2, and ε is a human-eye limiting angle of resolution.

Optionally, the human-eye limiting angle of resolution ε=2', and the aperture D of the lenses satisfies:

$$D \geq 2L\tan\left(\frac{N}{60}\right)°.$$

Optionally, N=2, and a minimum value of the aperture of the lenses $$D\min = 2L\tan\left(\frac{1}{30}\right)°.$$

Optionally, a first watching distance $L_F$ satisfies:

$$\frac{a/2 + e/2}{\tan\omega} \leq L_F \leq \frac{\Phi f}{2p};$$

a focal length f of the lenses satisfies:

$$f = \frac{(a+e)p}{\Phi\tan\omega} + \frac{2ps}{\Phi};$$

and
a placement height t of the lenses satisfies:

$$t = nf;$$

wherein a is a value of a side length of a longer side of the display screen, e is an interpupillary distance between human eyes, p is a pixel spacing of the display screen, Φ is a pupil diameter of a human eye, ω is a field angle of the lenses, s is a preset movable distance, and n is a refractive index of the lenses.

Optionally, a shape of a visible space of the device for optical-field displaying is a circular truncated cone;
- the circular truncated cone comprises a top circle and a bottom circle that are opposite, and the bottom circle is closer to the display screen than the top circle;
- a diameter of the bottom circle is the interpupillary distance between human eyes, and is less than a diameter d of the top circle; and
- the diameter d of the top circle satisfies:

$$d = \frac{D\Phi}{Np};$$

wherein D is the aperture of the lenses, Φ is the pupil diameter of a human eye, and p is the pixel spacing of the display screen.

Optionally, N=2, and the diameter d of the top circle satisfies:

$$d = \frac{D\Phi}{2p}.$$

Optionally, a shape of a visible space of the device for optical-field displaying is a first circular truncated cone and a second circular truncated cone that are joined, wherein the first circular truncated cone is closer to the display screen than the second circular truncated cone;

the first circular truncated cone comprises a bottom circle and a joining circle that are opposite, and the second circular truncated cone comprises the joining circle and a top circle that are opposite;

a diameter of the bottom circle is the interpupillary distance e between human eyes, and is less than a diameter d of the top circle and a diameter d2 of the joining circle;

the diameter d of the top circle satisfies:

$$d = \frac{D\Phi}{2p};$$

the diameter d2 of the joining circle satisfies:

$$d2 = \frac{aD}{2f\tan\omega - D};$$

a height h1 of the first circular truncated cone satisfies:

$$h1 = \frac{af}{2f\tan\omega - D} - \frac{a+e}{2\tan\omega};$$

and a height h2 of the second circular truncated cone satisfies:

$$h2 = s - h1;$$

wherein D is the aperture of the lenses, $\Phi$ is a pupil diameter of a human eye, p is a pixel spacing of the display screen, f is the focal length of the lenses, $\omega$ is a field angle of the lenses, a is the value of the side length of the longer side of the display screen, and s is a preset movable distance.

Optionally, a second watching distance $L_M$ satisfies:

$$\frac{ef}{D} \le L_M < \frac{a+e}{2\tan\omega};$$

wherein a is the value of the side length of the longer side of the display screen, e is the interpupillary distance between human eyes, D is the aperture of the lenses, f is the focal length of the lenses, and $\omega$ is the field angle of the lenses.

Optionally, a third watching distance $L_N$ satisfies:

$$L\min \le L_N < \frac{ef}{D};$$

wherein D is the aperture of the lenses, e is the interpupillary distance between human eyes, f is the focal length of the lenses, and Lmin is a minimum safe distance.

Optionally, the minimum safe distance Lmin is 12 mm.

Optionally, a resolution PPD of an optical-field imaging system of the device for optical-field displaying satisfies:

$$PPD = \frac{L}{D} * \frac{\pi}{180};$$

wherein D is an aperture of the lenses, and L is an actual watching distance.

Optionally, the focal lengths of the lenses are equal.

Optionally, the focal lengths of the lenses progressively increase in a first direction, wherein the first direction refers to a direction from a center position of the lens unit to an edge position of the lens unit.

Optionally, the display screen is a liquid-crystal display screen, the first substrate is a color-film substrate, and the second substrate is an array substrate; or, the display screen is an OLED display screen, the first substrate is an packaging substrate, and the second substrate is a displaying substrate of an OLED unit.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art can obtain other figures according to these figures without paying creative work.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, terms such as "first", "second" and "third" are used to distinguish identical items or similar items that have substantially the same functions and effects, merely in order to clearly describe the technical solutions of the embodiments of the present disclosure, and should not be construed as indicating or implying the degrees of importance or implicitly indicating the quantity of the specified technical features.

In the embodiments of the present disclosure, the meaning of "plurality of" is "two or more", unless explicitly and particularly defined otherwise.

Figure 1:
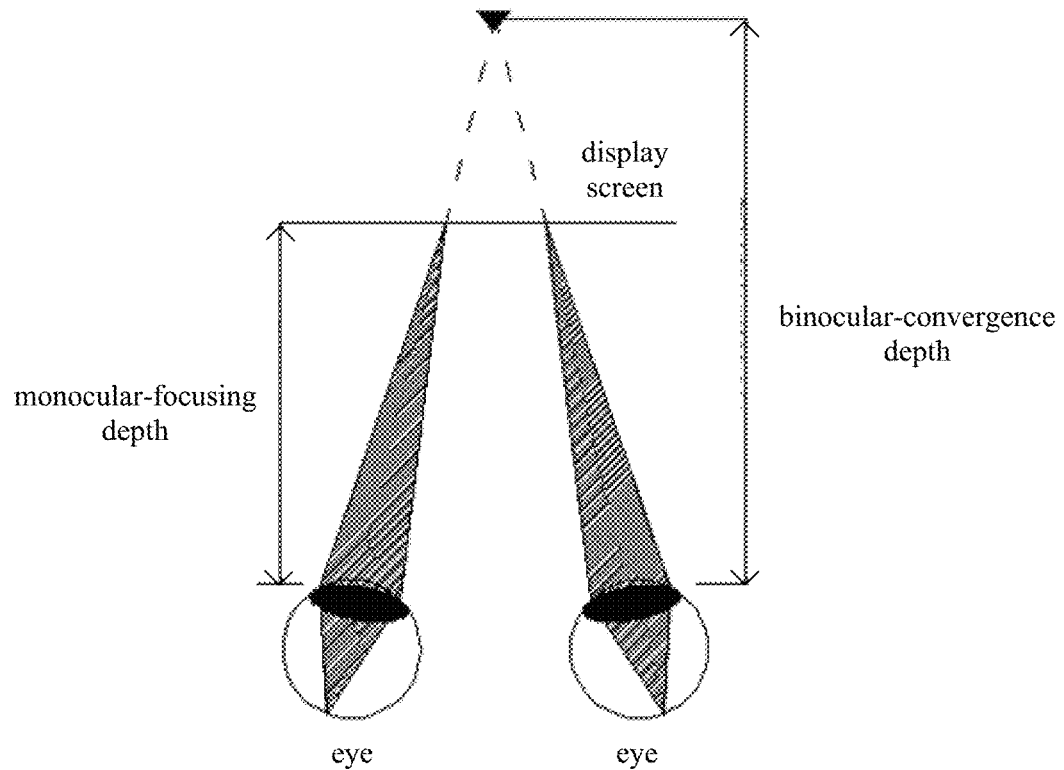
FIG. 1 is a schematic diagram of monocular focusing and binocular convergence in the related art.
Figure 2:
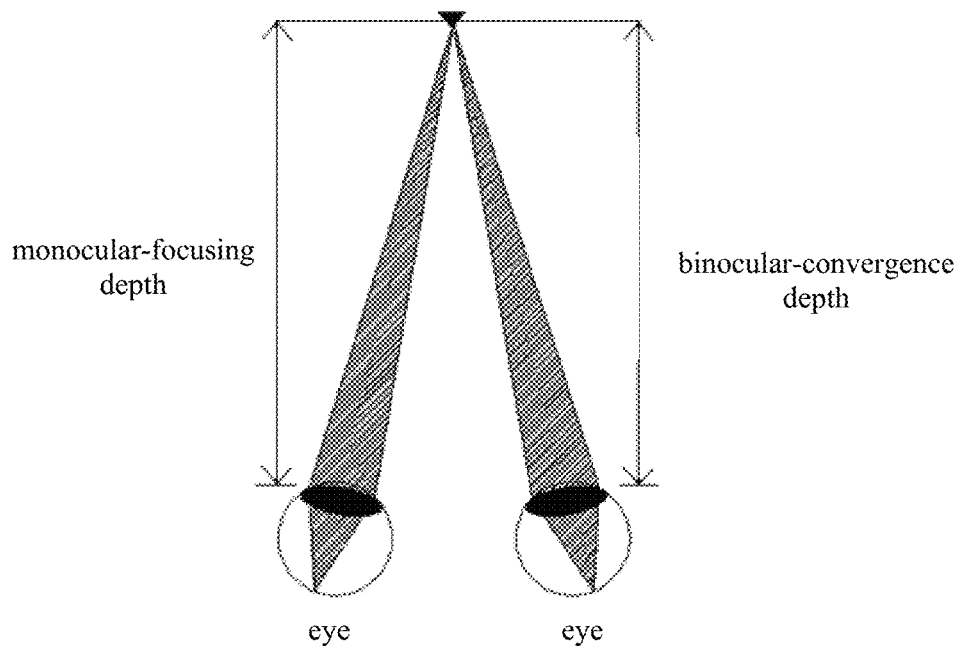
FIG. 2 is a schematic diagram of monocular focusing and binocular convergence when human eyes are watching the real world.

When the human eyes are observing the real world, referring to FIG. 2, the monocular-focusing depth and the binocular-convergence depth are at the same position, and no spinning sensation is generated. However, when the user is watching a 3D displaying device based on parallax, referring to FIG. 1, the monocular-focusing depth and the binocular-convergence depth are not equal, which causes visual fatigue, and in turn causes the user to have adverse experiences such as dizziness.

Figure 13:
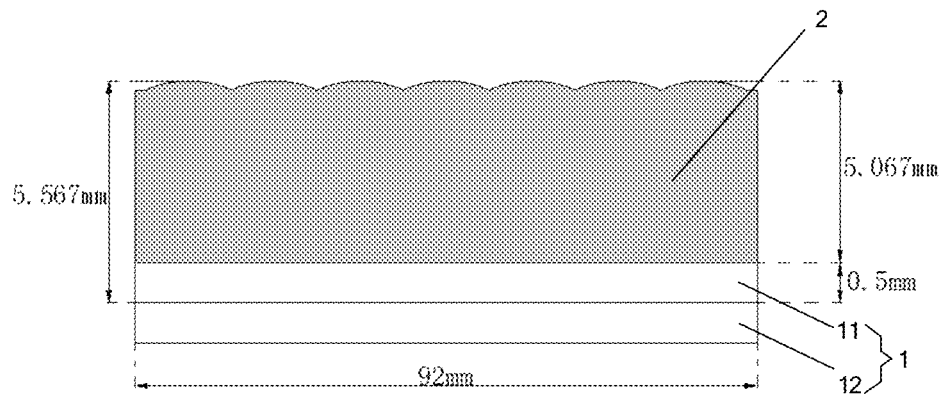
FIG. 13 is a schematic structural diagram of the device for optical-field displaying according to still another embodiment of the present disclosure.
Figure 14:
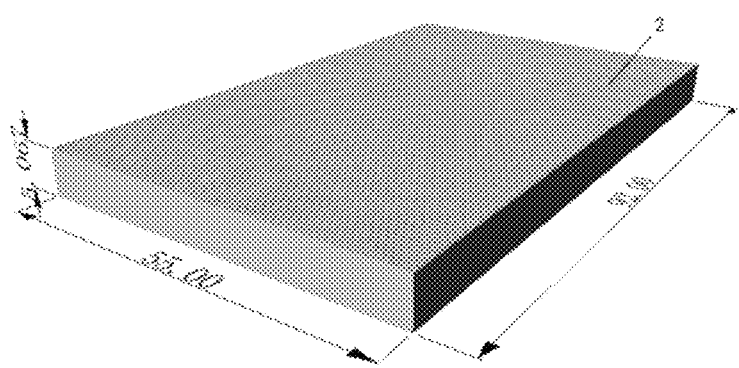
FIG. 14 is a schematic perspective view of the lens unit in FIG. 13.
Figure 15:
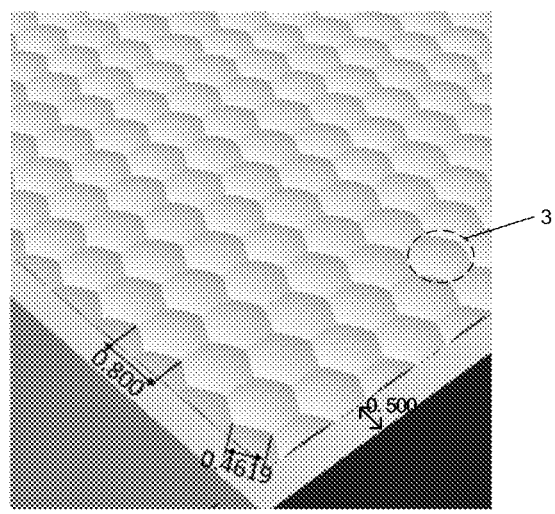
FIG. 15 is a partially enlarged view of FIG. 14.
Figure 16A:
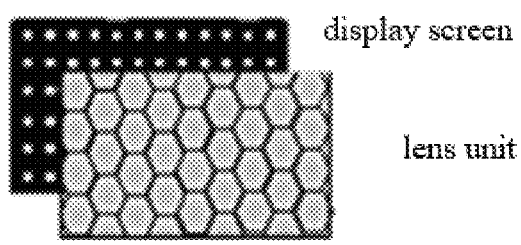
FIGS. 16a and 16b are schematic diagrams of the loading of the letter B of different depths by the display screen.
Figure 16B:
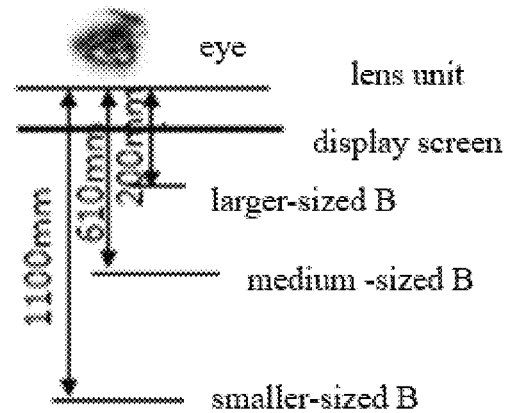

In order to solve the problem, the embodiments of the present disclosure provide a device for optical-field displaying. Referring to FIG. 13, the device for optical-field displaying includes: a display screen 1 and a lens unit 2 that is provided on the light exiting side of the display screen 1. Referring to FIGS. 14 and 15, the lens unit 2 includes a plurality of lenses 3 that are arranged in an array, and the display screen is provided on the focal plane of the plurality of lenses.

Referring to FIG. 13, the display screen 1 includes a first substrate 11 and a second substrate 12 that match, the first substrate is a light-exiting-side substrate, the second substrate includes a plurality of pixel islands that are arranged in an array, and each of the pixel islands includes at least one sub-pixel; and the plurality of pixel islands correspond to the plurality of lenses.

A view region formed by light rays that are emitted by the sub-pixels of the pixel islands and propagated via the corresponding lenses to a human eye is smaller than or equal to a half-pupil region, and light rays of different viewpoints that are emitted by different sub-pixels of the pixel islands enter different cone cells via the lenses.

The plurality of lenses that are arranged in an array have a small size, and thus may also be referred to as a microlens array. The shape and the size of the lenses are not particularly limited herein. As an example, the lenses may be spherical lenses.

The display screen is provided on the focal plane of the plurality of lenses. Accordingly, the light rays emitted by the display screen, after passing through the lenses, are converted into collimated light rays, thereby forming a light beam in a known direction. The display screen includes a first substrate and a second substrate. The first substrate is a light-exiting-side substrate. Accordingly, the light emitting face of the second substrate may be provided on the focal plane of the plurality of lenses.

The second substrate includes a plurality of pixel islands that are arranged in an array, and each of the pixel islands includes at least one sub-pixel. The sub-pixel herein may be any one of a red-color sub-pixel, a green-color sub-pixel and a blue-color sub-pixel. Each of the pixel islands may include all of the red-color sub-pixel, the green-color sub-pixel and the blue-color sub-pixel. Certainly, each of the pixel islands may also include merely one type of sub-pixel. For example, it includes merely a plurality of red-color sub-pixels, or includes merely a plurality of green-color sub-pixels, or includes merely a plurality of blue-color sub-pixels. That may be particularly determined according to practical demands.

The plurality of pixel islands correspond to the plurality of lenses. As an example, the plurality of pixel islands and the plurality of lenses are of a one-to-one correspondence relation.

The display screen may be a rigid display screen, and may also be a flexible display screen (i.e., bendable and foldable). Its type may be liquid-crystal display screens such as twisted nematic (TN) type, vertical alignment (VA) type, in-plane switching (IPS) type or advanced super dimension switch (ADS) type, may also be an organic light emitting diode (OLED) display screen, and may also be a Micro LED display screen or a Mini LED display screen. That may be particularly determined according to practical demands.

If the display screen is a liquid-crystal display screen, the first substrate may be a color-film substrate, and the second substrate may be an array substrate. If the display screen is an OLED display screen, the first substrate may be a packaging substrate, and the second substrate may be a displaying substrate including an OLED unit.

The cone cell is a human-eye visual cell, and is located in the retina. Because it can receive photostimulation, and convert the light energy into nerve impulse, it is also known as a photoreceptor. The acromere of the cone cell is of a cone shape, and therefore it is named a cone cell. The cone cell has a strong capacity of distinguishing strong light and colors. At the central recession of the *Macula lutea* of the retina, light rays can directly reach the cone cell.

The principle of optical-field displaying will be described below.

Figure 4:
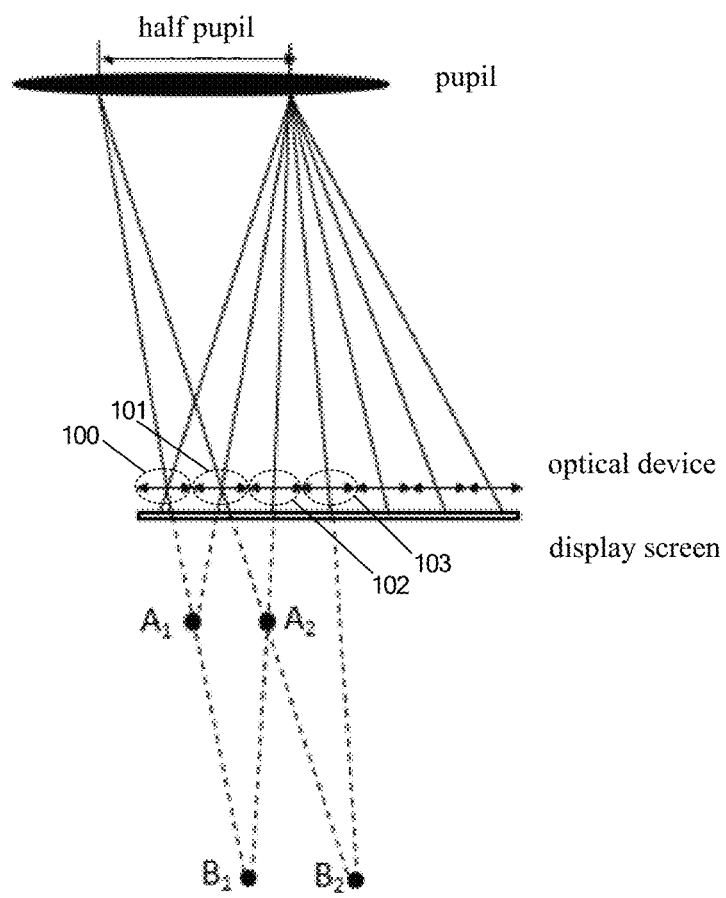
FIG. 4 is a schematic diagram of the view region that is formed by the light rays emitted by the device for optical-field displaying at the pupil according to an embodiment of the present disclosure.

Optical-field displaying is a true 3D displaying, and can realize a true 3D scene the same as the real world. Generally, a light beam in a known direction is referred to as a light-ray field in a space (referred to for short as an optical field). In an optical field, light beams entering a pupil, in order to image in space, are required to have an intersection point. Therefore, it can be known according to the geometrical relation that it is required that collimated light beams exiting from two or more neighboring sub-pixels simultaneously enter the pupil of a single eye (in other words, the single eye can simultaneously receive at least two viewpoints). Accordingly, it can be derived that, when the light rays emitted by the sub-pixels have passed through an optical device and traveled to the position of the pupil, the formed view region is ≤ a half-pupil region. Referring to FIG. 4, the image points that are formed by the light beams passing through the neighboring lenses are at screen-proximal positions, for example A1 and A2, wherein A1 is the image point that is formed by the light beams passing through the lens 100 and the lens 101, and A2 is the image point that is formed by the light beams passing through the lens 101 and the lens 102. Moreover, the image points that are formed by the light beams passing through the separate lenses are at screen-distal positions, for example B1 and B2, wherein B1 is the image point that is formed by the light beams passing through the lens 100 and the lens 102, and B2 is the image point that is formed by the light beams passing through the lens 101 and the lens 103. In FIG. 4, the display screen is provided on the focal plane of the optical device formed by the plurality of lenses, whereby the light rays emitted by the sub-pixels of the display screen, after passing through the optical device, can be converted into collimated light beams.

In addition, in order to realize the optical-field displaying, it must be satisfied that the human eye can identify the viewpoints that are simultaneously received, which requires that the light rays of the different viewpoints enter different cone cells.

Figure 3:
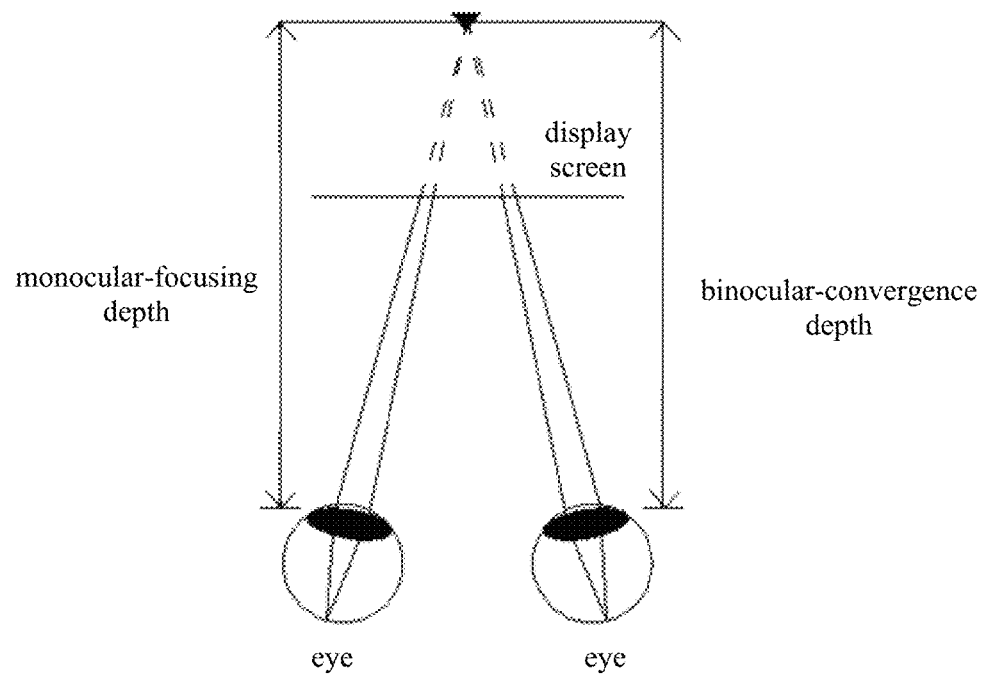
FIG. 3 is a schematic diagram of the monocular focusing and the binocular convergence according to an embodiment of the present disclosure.

The device for optical-field displaying according to the present disclosure obtained based on the above-described principle can provide an effective light-ray field that can be identified by a human eye. When the user is watching a 3D frame by using the device for optical-field displaying, referring to FIG. 3, the monocular focusing and the binocular convergence are at the same plane (in other words, the monocular-focusing depth and the binocular-convergence depth are equal), and there is no spinning sensation during the watching, which prevents the visual fatigue caused by unequal monocular-focusing depth and binocular-convergence depth in the related art.

Moreover, as the same as the watching of the real world directly by using the eyes, the user may perform focalization by using the crystalline lens of the human eye, thereby realizing selective focusing on the displayed frame, and in turn realizing transformation between clearness and obscureness of planes of different depths of field. Referring to FIGS. 16*a* and 16*b*, and FIGS. 17*a* to 17*c*, by using the display screen and the lens unit shown in FIG. 16*a*, letters B of different depths are loaded simultaneously on the display screen, wherein the depth of the larger-sized B is 200 mm, the depth of the medium-sized B is 610 mm, and the depth of the smaller-sized B is 1100 mm. It should be noted that the three letters B of different depths in FIGS. 16*a* and 16*b* have an equal actual size, but, because the 3 Bs have different distances to the human eye, in visual sense, the closer letter B is larger, and the further letter B is smaller. The effect of the camera photographing is similar to that of a human eye. As an example, regarding two objects of the equal size, wherein one is placed closer and the other is placed further, the image of the closer one photographed by using a camera is larger, and the image of the further one photographed by using a camera is smaller. In order to facilitate the description, the letters B of the depths of 200 mm, 610 mm and 1100 mm are referred to as the larger-sized B, the medium-sized B and the smaller-sized B respectively.

Figures 17A, 17B, 17C:
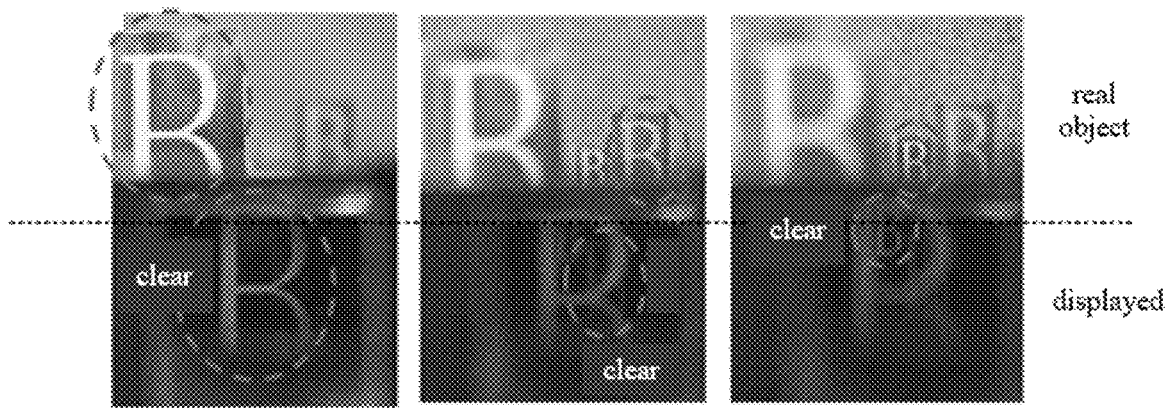
FIGS. 17a to 17c are schematic diagrams of the effect of displaying of FIGS. 16a and 16b.

The displayed frames in the display screen are shown as the object diagrams displayed above the dotted lines in FIGS. 17*a* to 17*c*. By focusing and photographing by using a large-aperture camera, to simulate the human-eye focusing, the frames below the dotted lines in FIGS. 17*a* to 17*c* can be obtained. FIG. 17*a* indicates that, when the camera is focusing on the larger-sized B, a clear frame of the larger-sized B is obtained, and those of the medium-sized B and the smaller-sized B are obscure; and the clarities of the picture of the larger-sized B photographed by using the camera and the picture of the larger-sized B displayed by using the display screen are the same. FIG. 17*b* indicates that, when the camera is focusing on the medium-sized B, a clear frame of the medium-sized B is obtained, and those of the larger-sized B and the smaller-sized B are obscure; and the clarities of the picture of the medium-sized B photographed by using the camera and the picture of the medium-sized B displayed by using the display screen are the same. FIG. 17*c* indicates that, when the camera is focusing on the smaller-sized B, a clear frame of the smaller-sized B is obtained, and those of the larger-sized B and the medium-sized B are obscure; and the clarities of the picture of the smaller-sized B photographed by using the camera and the picture of the smaller-sized B displayed by using the display screen are the same. FIGS. 16*a* and 16*b*, and FIGS. 17*a* to 17*c* can indicate that the device for optical-field displaying can perform focalization and photograph by using the crystalline lens of the human eye or a large-aperture camera, thereby realizing transformation between clearness and obscureness of planes of different depths of field.

In the device for optical-field displaying, the display screen is provided on the focal plane of the plurality of lenses, which can enable the light rays emitted by the pixel islands to be collimated, thereby forming a light beam in a known direction (i.e., a light-ray field in space, which is referred to for short as an optical field). In the optical field, a view region formed by light rays that are emitted by the sub-pixels of the pixel islands and propagated via the corresponding lenses to a human eye is smaller than or equal to a half-pupil region, and accordingly the pupil of a single eye can simultaneously receive at least two viewpoints. Because the light rays of different viewpoints that are emitted by different sub-pixels of the pixel islands enter different cone cells via the lenses, the human eye can identify different viewpoints received at the same moment. Therefore, if the different viewpoints formed by the device for optical-field displaying reflect different frames, an effect of focused 3D displaying of a single eye can be realized. At this point, the single eye no longer focuses on the display screen, but focuses on the displayed 3D image, thereby realizing that the monocular focusing and the binocular convergence are at the same plane, and in turn preventing visual fatigue caused by unequal monocular-focusing depth and binocular-convergence depth, to prevent a spinning sensation of the user.

It should be noted that FIGS. 13-15 merely exemplarily show the sizes of the relevant components, and the sizes are not limited thereto in practice. Different device for optical-field displayings may be designed particularly according to sizes of actual display screens.

In order to realize that the light rays of different viewpoints that are emitted by different sub-pixels of the pixel islands enter different cone cells via the lenses, to enable the different viewpoints to be identified by the human eye, optionally, the lenses are spherical lenses, and the plurality of lenses are closely arranged. The aperture D of the lenses satisfy:

$$D \geq 2L\tan\left(\frac{N\varepsilon}{120}\right)°;$$

wherein L is an actual watching distance, N is a quantity of the viewpoints, N≥2, and ε is a human-eye limiting angle of resolution.

The shape of the cross section of the lenses in the direction perpendicular to their principal optic axes is not limited herein. It may be a hexagon, as shown in FIG. 15, and may also be another polygon such as a triangle, a tetragon and a pentagon. That the plurality of lenses are closely arranged refers to that any two neighboring lenses directly contact and are closely connected.

The aperture of the lenses refers to the diameter of the inscribed circle of the cross section of the lenses in the direction perpendicular to their principal optic axes. As an example, if the shape of the cross section of the lenses in the direction perpendicular to their principal optic axes is a hexagon, then the aperture of the lenses is the diameter of the inscribed circle of the hexagon. Further, if the hexagon is a regular hexagon, then the diameter of the inscribed circle of the regular hexagon is the distance between two opposite sides of the regular hexagon (i.e., the opposite-side distance). As an example, in FIG. 15, the side length of the regular hexagon is 461.9 μm (0.4619 mm), and the opposite-side distance is 800 μm (0.800 mm).

Figure 7:
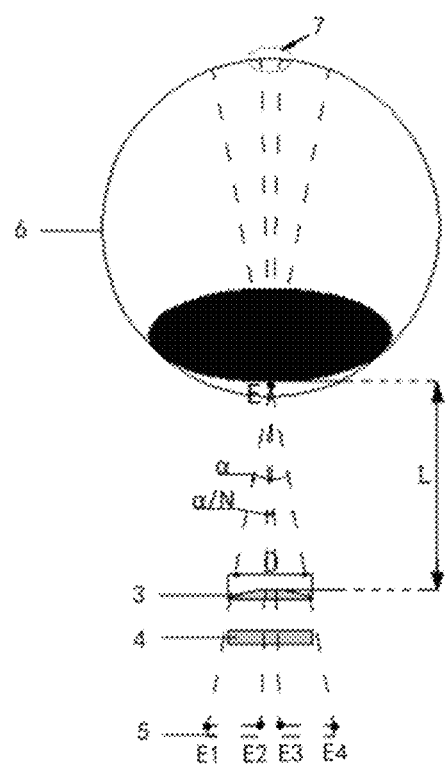
FIG. 7 is a schematic structural diagram of the device for optical-field displaying according to another embodiment of the present disclosure.

Referring to FIG. 7, $$\frac{\alpha}{N} \geq \varepsilon,$$

to satisfy that one cone cell 7 receives and identifies merely one viewpoint, i.e., to ensure that the light rays of the neighboring viewpoints cannot fall on the same cone cell, wherein α is the total included angle of the aperture of the lens relative to the human eye. Moreover, referring to FIG. 7, it can be obtained according to the geometrical relation that $$\alpha = 2\arctan\frac{D}{2L}.$$

By solving those two relations, it can be obtained that $$D \geq 2L\tan\left(\frac{N\varepsilon}{120}\right)°,$$

wherein L is an actual watching distance, i.e., the distance from the lens to the human eye. In FIG. 7, the light rays emitted by the pixel island 4 are amplified by the lens 3 and enter the human eye 6. It should be noted that the pixel island 4 is provided on the focal plane of the lens 3. Therefore, the image formed by the lens is at an infinite distance, and FIG. 7 merely illustratively illustrates the formed image 5. In addition, in order to clearly describe α and α/N, in FIG. 7, five points E, E1, E2, E3 and E4 are marked, wherein α is ∠E1EE4, and α/N is ∠E2EE3.

Further, because the range of the human-eye limiting angle of resolution is 1'-2', in order to satisfy the watching of most of people, the human-eye limiting angle of resolution is selected to be ε=2', and it can be obtained that $$D \geq 2L\tan\left(\frac{N}{60}\right)°.$$

The resolution PPD (Pixel Per Degree) of the optical-field imaging system of the device for optical-field displaying is of an inverse relation with the aperture of the lens (the particular relation may refer to the subsequent relevant description). Therefore, in order to obtain a maximized resolution, to realize a better displaying, the aperture of the lens may be designed to be minimized. Particularly, N=2, and a minimum value of the aperture of the lenses $$D\min = 2L\tan\left(\frac{1}{30}\right)°.$$

It should be noted that the different watching distances result in different effects of watching. The actual watching distance L may be any one of the first watching distance $L_F$, the second watching distance $L_M$ and the third watching distance $L_N$. The first watching distance $L_F$ (also referred to as a long-distance watching distance) can satisfy long-distance binocular or monocular watching, in which case the view fields of the two eyes coincide, and both of a single eye and two eyes can watch the whole of the display screen. The second watching distance $L_M$ (also referred to as a medium-distance watching distance) can satisfy medium-distance binocular or monocular watching, in which case the view fields of the two eyes partially coincide, the monocular watching can merely see part of the display screen, and the binocular watching can see the whole of the display screen. The third watching distance $L_N$ (also referred to as a short-distance watching distance) can satisfy short-distance binocular or monocular watching, in which case the view fields of the two eyes do not coincide, and either two eyes or a single eye can merely see part of the display screen. In other words, the device for optical-field displaying can realize three types of displaying of different watching distances, thereby satisfying the demands of different users.

The relation that the first watching distance $L_F$ is required to satisfy will be described below.

In order to satisfy the long-distance binocular or monocular watching (in other words, the view fields of the two eyes coincide, and both of a single eye and two eyes can watch the whole of the display screen), a first watching distance $L_F$ satisfies:

$$\frac{a/2 + e/2}{\tan\omega} \leq L_F \leq \frac{\Phi f}{2p};$$

a focal length f of the lenses satisfies:

$$f = \frac{(a+e)p}{\Phi\tan\omega} + \frac{2ps}{\Phi};$$

and a placement height t of the lenses satisfies: t=nf; wherein a is a value of a side length of a longer side of the display screen, e is an interpupillary distance between human eyes, p is a pixel spacing of the display screen, $\Phi$ is a pupil diameter of a human eye, $\omega$ is a field angle of the lenses, s is a preset movable distance, and n is a refractive index of the lenses.

Figure 5:
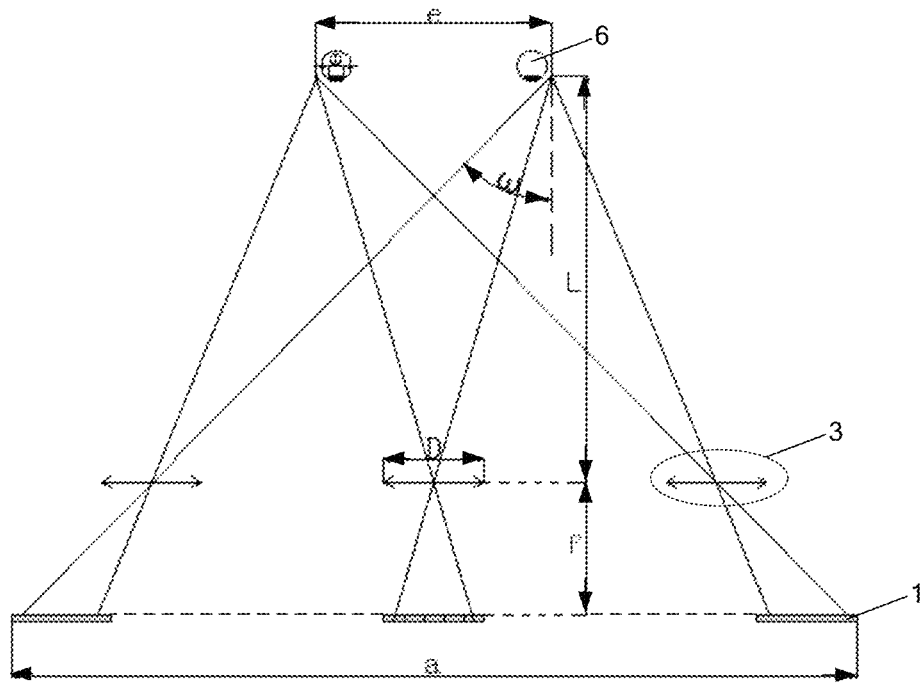
FIG. 5 is a schematic structural diagram of the device for optical-field displaying according to an embodiment of the present disclosure.
Figure 6:
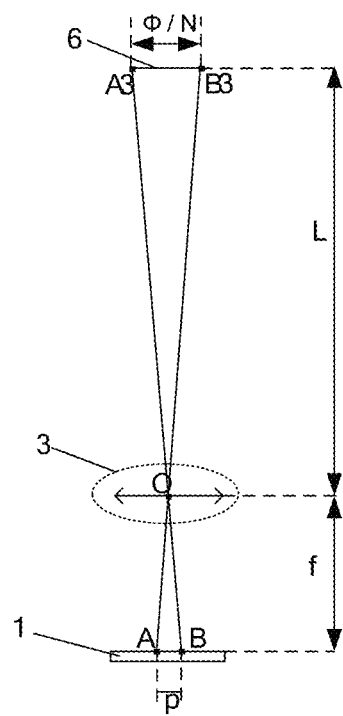
FIG. 6 is an equivalent schematic diagram of FIG. 5.

Referring to FIG. 5, $$L_F \tan\omega \geq \frac{a}{2} + \frac{e}{2}$$

to ensure that a single eye can see all of the sub-pixels of the display screen. Referring to FIG. 6, according to the geometrical relation, $\Delta OA3B3$ and $\Delta OAB$ are similar, and therefore $$\frac{\Phi/N}{p} = \frac{L_F}{f}.$$

Further, because N≥2, by solving those three relations, it is obtained that the first watching distance $L_F$ satisfies:

$$\frac{a/2 + e/2}{\tan\omega} \leq L_F \leq \frac{\Phi f}{2p}.$$

The L in FIGS. 5 and 6 are equivalent to the first watching distance $L_F$.

If the preset movable distance of the long-distance watching is s, then $$s = \frac{\Phi f}{2p} - \frac{a/2 + e/2}{\tan\omega}.$$

By solving the relation, it can be obtained that $$f = \frac{(a+e)p}{\Phi \tan\omega} + \frac{2ps}{\Phi}.$$

If s=200 mm, then $$f = \frac{(a+e)p}{\Phi \tan\omega} + \frac{400p}{\Phi}.$$

It should be noted that FIGS. 5 and 6 illustrate the schematic diagram in an equivalent air field, and the distance between the lens and the display screen is represented by the focal length f of the lens. In practice, a glass substrate exists between the lens and the display screen. Therefore, the actual placement height of the lens, i.e., the placement height t, satisfies: t=nf.

According to the above relations, the particular design parameters of the device for optical-field displaying can be obtained. Taking the parameters of two different high-resolution display screens as an example, according to the relations that the first watching distance $L_F$, the focal length f, the placement height t and the minimum value Dmin of the lens aperture satisfy, the design parameters shown in Table 1 can be obtained.

In the first design and the second design in Table 1, the preset movable distance s of the long-distance watching is equal to 200 mm, the range of the first watching distance $L_F$ of the first design is 459.37 mm-659.37 mm, and the range of the first watching distance $L_F$ of the second design is 552.95 mm-752.95 mm. The lens aperture in Table 1 is the aperture of the lens, and is calculated by using the relations that the minimum value Dmin of the lens aperture satisfies. It should be noted that the lens focal length f in Table 1 is the above-described focal length f

TABLE 1

| | | | | known | | | | | |
|---|---|---|---|---|---|---|---|---|---|
| | | | p = 8.5 μm, 11.93 μm pixel pitch | $\omega = \pm 10°$ (single lens FOV) lens parameters | $\varphi = 3$ mm pupil diameter | e = 70 mm interpupillary distance | $\epsilon = 2'$ human-eye resolution watching distance | n = 1.49 lens refractive index | |
| | a = 92, 125 mm panel size (longer side) | | lens focusing | lens placement height | lens aperture | | long distance | | |
| Obtained | 4.2" 10K a = 92 mm p = 8.5 μm | first design | f = 3.736 mm | t = 5.567 mm | D = 0.8 mm | | 459.37 mm-659.37 mm | | |
| | 5.7" 10K a = 125 mm p = 11.93 μm | second design | f = 5.988 mm | t = 8.923 mm | D = 0.9 mm | | 552.95 mm-752.95 mm | | |

The visible space of the device for optical-field displaying that satisfies the long-distance binocular watching will be described below. By watching in the visible space, a better effect of displaying can be obtained. The visible space, which may also be referred to as an eye box, refers to a region between the display screen and the eyes, and is the region where the displayed contents are most clear, and the area beyond the region might have problems such as image blurring, dislocation and even no content displaying.

According to the differences in the parameters such as the size of the display screen and the placement height of the lens, the visible spaces of two shapes can be obtained.

In the first type, the shape of the visible space of the device for optical-field displaying is a circular truncated cone (i.e., a single circular truncated cone); the circular truncated cone includes a top circle and a bottom circle that are opposite, and the bottom circle is closer to the display screen than the top circle; and a diameter of the bottom circle is the interpupillary distance between human eyes, and is less than a diameter d of the top circle.

The diameter d of the top circle satisfies:

$$d = \frac{D\Phi}{2p};$$

wherein D is the aperture of the lenses, Φ is the pupil diameter of a human eye, and p is the pixel spacing of the display screen.

Figure 8:
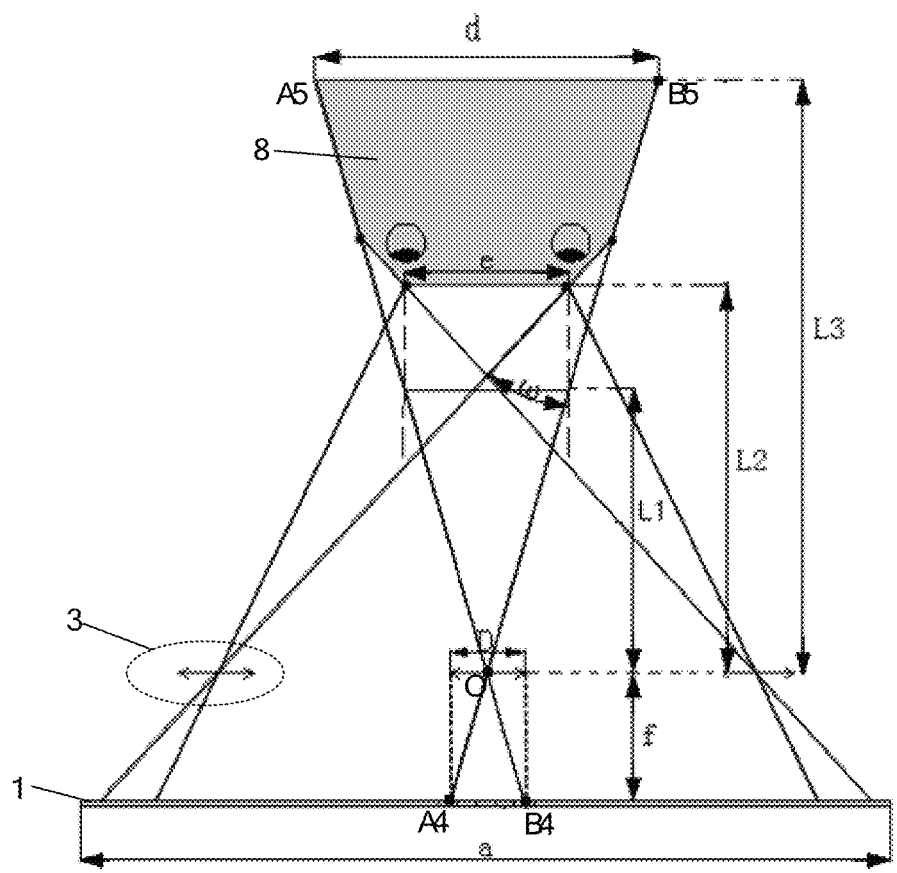
FIG. 8 is a schematic structural diagram of the device for optical-field displaying according to yet another embodiment of the present disclosure.

Referring to FIG. 8, according to the geometrical relation, ΔOA4B4 and ΔOA5B5 are similar, and therefore $$\frac{d}{D} = \frac{L_3}{f}.$$

Moreover, according to the above, it can be known that $$\frac{\Phi/N}{p} = \frac{L_3}{f}.$$

By solving the two relations, it can be obtained that $$d = \frac{D\Phi}{Np},$$

wherein N≥2. When N=2, it can be obtained that $$d = \frac{D\Phi}{2p}.$$

Certainly, N may also be another positive integer such as 3, 4 and 5, and N=2 is taken as an example for the description here. It should be noted that the shape of the visible space 8 shown in FIG. 8 is formed by joining double circular truncated cones, and the shape of the visible space here is a single circular truncated cone. The formula for calculating the diameter of the top circle of the double circular truncated cones is the same as the formula for calculating the diameter of the top circle of the single circular truncated cone, and thus is described with reference to FIG. 8 here. The height of the circular truncated cone may be the preset movable distance s. If s=200 mm, then the height of the circular truncated cone is also 200 mm, and the diameter e of the bottom circle may be 70 mm. By substituting the relevant parameters of the first design in Table 1 into the above relations, it can be obtained that the shape of the visible space of the first design is a single circular truncated cone, wherein the diameter of the top circle is 141.18 mm, the diameter of the bottom circle is 70 mm, and the height of the circular truncated cone is 200 mm.

Figure 9:
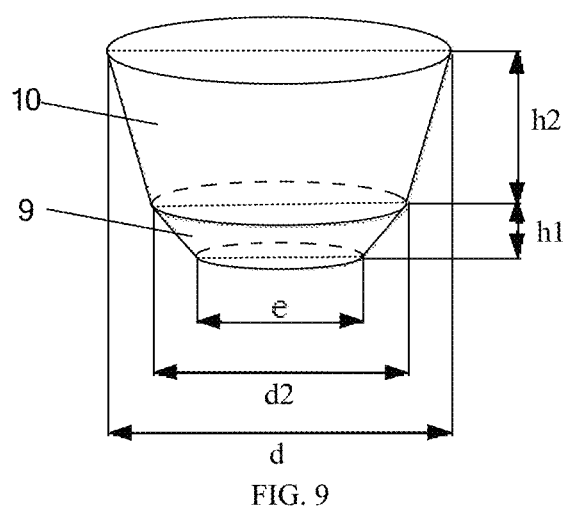
FIG. 9 is a schematic structural diagram of the visible region of the device for optical-field displaying according to an embodiment of the present disclosure.

In the second type, referring to FIG. 9, the shape of the visible space of the device for optical-field displaying is a first circular truncated cone 9 and a second circular truncated cone 10 that are joined (i.e., double circular truncated cones), wherein the first circular truncated cone is closer to the display screen than the second circular truncated cone; and the first circular truncated cone includes a bottom circle and a joining circle that are opposite, and the second circular truncated cone includes the joining circle and a top circle that are opposite.

Referring to FIG. 8, a diameter of the bottom circle is the interpupillary distance e between human eyes, and is less than a diameter d of the top circle and a diameter d2 of the joining circle. According to the geometrical relation, the diameter d of the top circle satisfies:

$$d = \frac{D\Phi}{2p};$$

the diameter d2 of the joining circle satisfies:

$$d2 = \frac{aD}{2f\tan\omega - D};$$

a height h1 of the first circular truncated cone satisfies:

$$h1 = \frac{af}{2f\tan\omega - D} - \frac{a+e}{2\tan\omega};$$

and a height h2 of the second circular truncated cone satisfies: h2=s−h1.

Wherein D is the aperture of the lenses, Φ is a pupil diameter of a human eye, p is a pixel spacing of the display screen, f is the focal length of the lenses, ω is a field angle of the lenses, a is the value of the side length of the longer side of the display screen, and s is a preset movable distance.

The total height of the double circular truncated cones may be the preset movable distance s. If s=200 mm, then the total height of the double circular truncated cones is also 200 mm, and the diameter e of the bottom circle may be 70 mm. by substituting the relevant parameters of the second design in Table 1 into the above relations, it can be obtained that the shape of the visible space of the second design is double circular truncated cones, wherein the diameter of the top circle is 113.16 mm, the diameter of the joining circle (i.e., the middle circle) is 92.833 mm, the diameter of the bottom circle is 70 mm, the height of the first circular truncated cone is 64.746 mm, the total height of the double circular truncated cones is 200 mm, and the height of the second circular truncated cone is 200 mm-64.746 mm=135.254 mm.

It should be noted that both of the above-described two types of visible spaces are used for long-distance binocular and monocular watching. The first type of visible space is suitable for a device for optical-field displaying having a smaller size of the display screen and a lower placement height of the lens. The second type of visible space is suitable for a device for optical-field displaying having a larger size of the display screen and a higher placement height of the lens.

The requirements on the parameter design of the device for optical-field displaying that satisfies the medium-distance binocular and monocular watching will be described below, in which case the view fields of the two eyes partially coincide, the monocular watching can merely see part of the display screen, and the binocular watching can see the whole of the display screen.

A second watching distance $L_M$ satisfies:

$$\frac{ef}{D} \le L_M < \frac{a+e}{2\tan\omega};$$

wherein a is the value of the side length of the longer side of the display screen, e is the interpupillary distance between human eyes, D is the aperture of the lenses, f is the focal length of the lenses, and ω is the field angle of the lenses.

Referring to FIG. 8, a second watching distance $L_M$ satisfies: L1≤$L_M$<L2. Moreover, according to the geometrical relation, $$\frac{e}{D} = \frac{L1}{f}.$$

By solving the relation, it can be obtained that $$L1 = \frac{ef}{D}.$$

According to the above-described contents describing the long-distance watching, it can be known that $$L\tan\omega \ge \frac{a}{2} + \frac{e}{2}$$

can ensure that a single eye can see all of the sub-pixels of the display screen, and accordingly $$L\tan\omega < \frac{a}{2} + \frac{e}{2}$$

can satisfy the requirements on the medium-distance watching. By solving the relation, it can be obtained that $$L < \frac{a+e}{2\tan\omega},$$

and then $$L2 = \frac{a+e}{2\tan\omega}.$$

In conclusion, it can be finally obtained that $$\frac{ef}{D} \le L_M < \frac{a+e}{2\tan\omega}.$$

By individually substituting the relevant parameter values of the first design and the second design in Table 1, it can be obtained that the range of the medium-distance watching distance of the first design is 326.94 mm-459.3 mm, and the range of the medium-distance watching distance of the second design is 465.77 mm-552.95 mm.

The requirements on the parameter design of the device for optical-field displaying that satisfies the short-distance binocular and monocular watching will be described below, in which case the view fields of the two eyes do not coincide, and either two eyes or a single eye can merely see part of the display screen.

A third watching distance $L_N$ satisfies:

$$L\min \le L_N < \frac{ef}{D};$$

wherein D is the aperture of the lenses, e is the interpupillary distance between human eyes, f is the focal length of the lenses, Lmin is a minimum safe distance, and n is a refractive index of the lenses.

Referring to FIG. 8, a third watching distance $L_N$ satisfies: Lmin≤$L_N$<L1. It can be known according to the geometrical relation that $$L1 = \frac{ef}{D},$$

wherein Lmin is a minimum safe distance, i.e., the safe distance that prevents the eyelash and the nose bridge from contacting the device, and is generally set to be 12 mm.

By individually substituting the relevant parameter values of the first design and the second design in Table 1, it can be obtained that the range of the short-distance watching distance of the first design is 12 mm-326.94 mm, and the range of the short-distance watching distance of the second design is 12 mm-456.77 mm.

Optionally, the resolution PPD (Pixel Per Degree) of an optical-field imaging system of the device for optical-field displaying satisfies:

$$PPD = \frac{L}{D} * \frac{\pi}{180};$$

wherein D is an aperture of the lenses, and L is an actual watching distance.

Angular resolution is used to define the resolution of the optical-field imaging system of the device for optical-field displaying. The angular resolution refers to the distinguishing capacity of the imaging system or the system elements, i.e., the capacity of the imaging system or the system element of discriminatingly distinguishing the minimum spacing between two neighboring objects. The angular resolution is generally expressed by using the magnitude of the opening angle between two smallest targets that are distinguishable by the imaging system.

Figure 10:
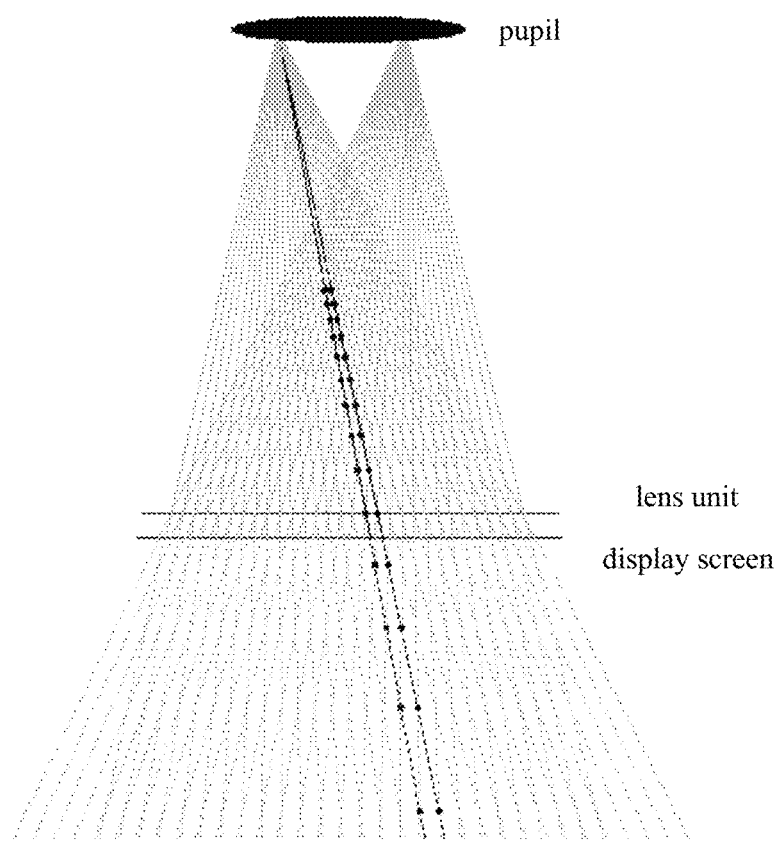
FIG. 10 is a schematic diagram of two viewpoints formed on the pupil by the device for optical-field displaying according to an embodiment of the present disclosure.
Figure 11:
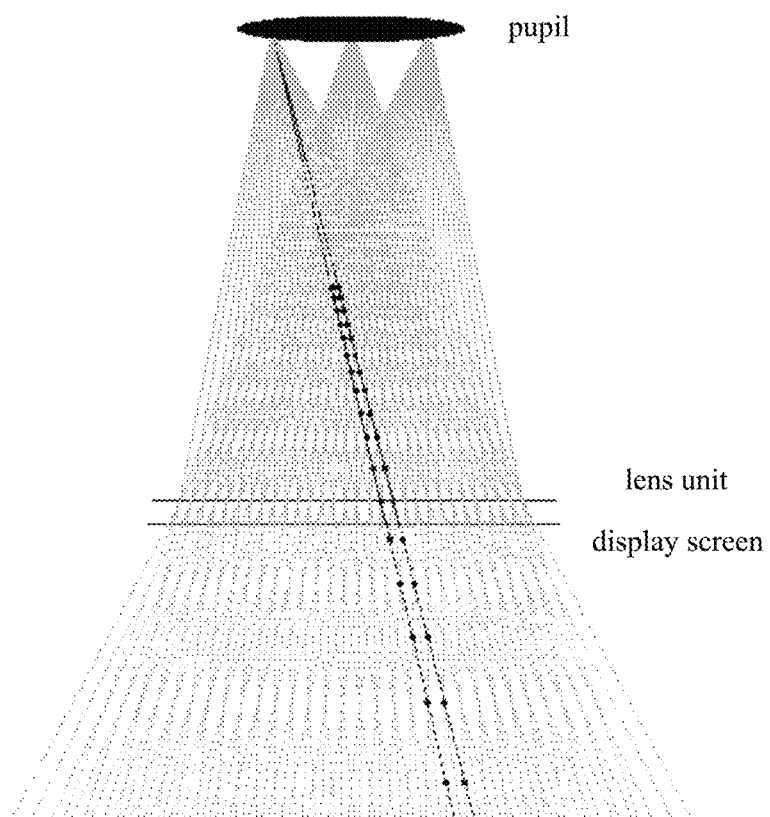
FIG. 11 is a schematic diagram of three viewpoints formed on the pupil by the device for optical-field displaying according to an embodiment of the present disclosure.

In FIGS. 10 and 11, the same depth-of-field plane contains two neighboring displaying points (represented by two small black spots on the left and right), all of displaying points on the left in different depth-of-field planes are located in the same straight line, and all of displaying points on the right in different depth-of-field planes are located in the same straight line, which indicates that the angular resolutions of the depth-of-field planes are equal. The PPI (Pixels Per Inch, or image resolution) of the display screen in FIG. 11 is greater than the PPI of the display screen in FIG. 10, and the apertures of the lenses in FIGS. 10 and 11 are equal. By comparing FIGS. 10 and 11, it can be obtained that the optical-field system whose display screen has a higher resolution has a higher quantity of the longitudinal depth-of-field planes.

The magnitude of the angular resolution is correlated with the aperture of the lens and the watching distance, and the particular relation is:

$$\alpha 1 = \frac{D}{L} * \frac{180}{\pi} * 60.$$

Therefore, $$PPD = \frac{60}{\alpha 1} = \frac{L}{D} * \frac{\pi}{180}.$$

By substituting the relevant data in Table 1, it is obtained that, in the first design, when the watching distance L varies within 12 mm-659.37 mm, the range of α is 227.1'-4.17', and the range of PPD is 0.26-14.39; and in the second design, when the watching distance L varies within 12 mm-752.95 mm, the range of α is 258'-4.11', and the range of PPD is 0.23-14.6.

The two modes of setting the focal lengths of the lenses in the lens unit will be described below.

In the first mode, the focal lengths of the lenses are equal, which can reduce the difficulty in the fabrication of the lens unit, thereby reducing the cost.

As an example, the process may include firstly obtaining the focal lengths of the lenses located at the center position and the edge position, subsequently taking the average value of them, and finally using the average value as the focal length of each of the lenses. The parameters of the lenses located at the center position and the edge position such as the focal length, the field angle, the curvature radius (i.e., the radius in Table 2) and the emergent-light divergence angle may refer to Table 2. In the first design and the second design in Table 2, all of the field angles (FOV) of the edge lenses are 10°, all of the emergent-light divergence angles of the edge lenses are less than 0.505°, and all of the emergent-light divergence angles of the center lens are less than 0.505°, which can ensure the effect of collimation of the lenses, wherein 0.505° is an empirical value for realizing optical-field displaying.

lower-deviation radius r=1.825 mm is used, the emergent-light-beam divergence angle is 0.314°. When the upper-deviation radius r=1.885 mm is used, the emergent-light-beam divergence angle is 0.316°. In the edge lenses of the first design, when the optimum-value radius r=1.884 mm is used, the emergent-light-beam divergence angle is 0.230°. When the lower-deviation radius r=1.854 mm is used, the emergent-light-beam divergence angle is 0.364°. When the upper-deviation radius r=1.914 mm is used, the emergent-light-beam divergence angle is 0.270°. Moreover, in order to facilitate the fabrication of the lenses, array lenses whose fabrication parameters are the same are used. Particularly, the average values of the relevant parameters of the center lens and the edge lenses may be taken. For example, in the lenses of the first design, the radius average value r=1.87 mm is taken, in which case the emergent-light divergence angle of the center lens is 0.225°, and the emergent-light divergence angle of the edge lenses is 0.361°. The definitions of the relevant data of the second design are the same as those of the first design, and are not discussed here further.

In the second mode, the focal lengths of the lenses progressively increase in a first direction, wherein the first direction refers to a direction from a center position of the lens unit to an edge position of the lens unit.

Figure 12:
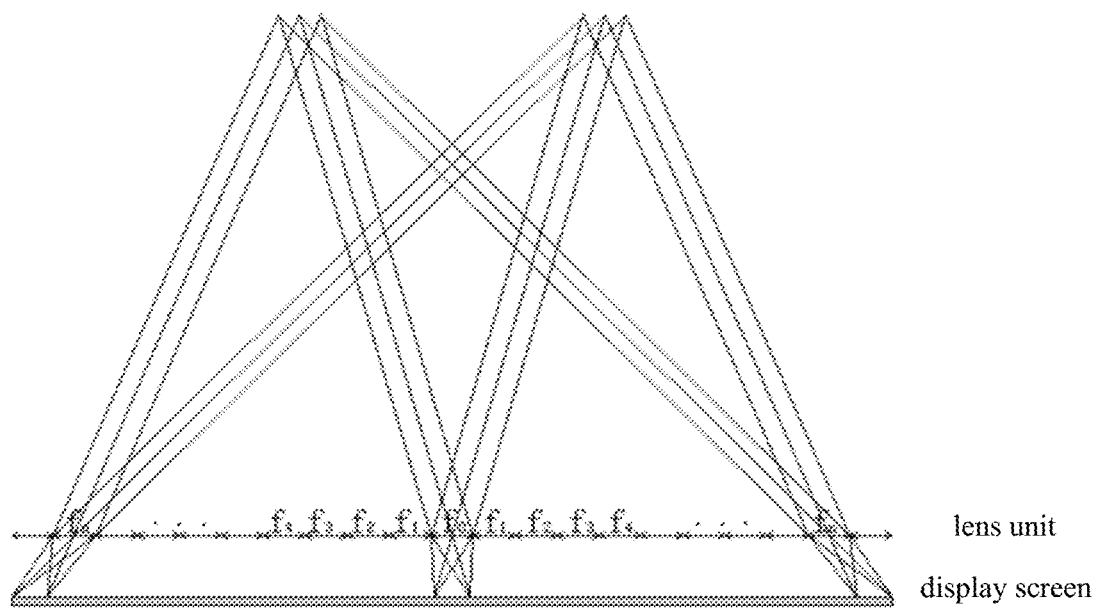
FIG. 12 is a schematic diagram of the different focal lengths corresponding to the lenses at different positions of the device for optical-field displaying according to an embodiment of the present disclosure.

Because of the influence by the lens aberration (i.e., the curvature of field), with the increasing of the field angle (FOV) of a single lens, its effect of collimation of light rays decreases, or, in other words, the collimation degree of the light beam exiting from the lens decreases, which affects the effect of displaying. Therefore, in the lens unit, the focal lengths of the lenses may progressively increase in a first direction, wherein the first direction refers to a direction from a center position of the lens unit to an edge position of the lens unit. Referring to FIG. 12, fn> . . . >f4>f3>f2>f1>f0 (f0 is the focal length of the lens located at the center position, fn is the focal length of the lenses located at the edge position, and the focal lengths of the lenses located between the center position and the edge position are sequentially f1, f2 . . . A whereby, when the FOV (field

TABLE 2

| solution | lens position | FOV | focal length (mm) | radius (mm) | emergent-light divergence angle | average radius | emergent-light divergence angle |
|---|---|---|---|---|---|---|---|
| first design | center | 0° | 3.74677 | 1.855 ± 0.03 | 0.134° 0.314°/0.316° | 1.87 ± 0.03 | 0.225° 0.226°/0.405° |
| | edge | 10° | 3.82106 | 1.884 ± 0.03 | 0.230° 0.364°/0.270° | | 0.361° 0.625°/0.312° |
| second design | center | 0° | 6.03728 | 2.950 ± 0.03 | 0.137° 0.227°/0.224° | 2.99 ± 0.03 | 0.280° 0.137°/0.227° |
| | edge | 10° | 6.18101 | 3.031 ± 0.03 | 0.180° 0.270°/0.180° | | 0.280° 0.361°/0.212° |

By software simulation, the optimized data in Table 2 are obtained. Table 2 merely illustrates the data of the center lens and the edge lenses, and gives a certain tolerance analysis. For example, in the center lens of the first design, when the optimum-value radius r=1.855 mm is used, the emergent-light-beam divergence angle is 0.134°. When the angle) of a single lens reaches ±10°, the emergent-light divergence angle is less than 0.505°, thereby ensuring the effect of collimation.

By integrating the relevant data in Table 1 and Table 2, Table 3 can be obtained. Table 3 gives the particular design parameters of the device for optical-field displayings corresponding to two display screens of different sizes.

TABLE 3

| | | p = 8.5 μm, 11.93 μm pixel pitch lens parameters obtained | | ω = ±10° (single lens FOV) | | φ = 3 mm pupil diameter watching distance |
|---|---|---|---|---|---|---| a = 92, 125 mm panel size (longer side)

| | | lens curvature radius | lens aperture | lens placement height | long distance | medium distance |
|---|---|---|---|---|---|---|
| 4.2" 10K a = 92 m | first soluteon | r = 1.87 ± 0.03 mm | D = 0.8 ± 0.01 mm | t = 5.567 ± 0.05 mm | 459.37-659.37 mm | 326.94-459.37 mm |
| 5.7" 10K a = 125 mm | second soluteon | r = 2.99 ± 0.03 mm | D = 0.9 ± 0.01 mm | t = 8.923 ± 0.05 mm | 552.95-752.95 mm | 465.77-552.95 mm | known

| φ = 3 mm pupil diameter watching distance | e = 70 mm interpupillary distance binocular eye-box space (space of circular truncated cone) of long-distance watching obtained | ε = 2' human-eye resolution | | | n = 1.49 lens refractive index resolution of optical-field displaying system | |
|---|---|---|---|---|---|---|

| short distance | diameter of bottom circle | diameter of middle circle | diameter of top circle | height of circular truncated cone | distance from middle circle to bottom circle | angular resolution | PPD |
|---|---|---|---|---|---|---|---|
| 12-326.94 mm | 70 mm | no | 141.18 mm | 200 mm | no | 227'-4.17' | 0.26-14.39 |
| 12-465.77 mm | 70 mm | 92.833 mm | 113.16 mm | 200 mm | 64.746 mm | 258'-4.11' | 0.23-14.6 |

The device for optical-field displaying of the first solution in Table 3 may be shown in FIG. 13, wherein the length of the longer side of the display screen 1 is 92 mm, the thickness of the first substrate is 0.5 mm, the thickness of the lens unit 2 is 5.067 mm, and accordingly in the lens unit the distance between the lens and the second substrate (equivalent to the placement height t of the lens) is 5.067 mm+0.5 mm=5.567 mm. Referring to FIG. 14, the length of the longer side of the lens unit is 92.00 mm, the length of the shorter side is 55.00 mm, and the thickness is 5.067 mm. Referring to FIG. 15, the lenses in the lens unit are spherical lenses, and the plurality of lenses are closely arranged, the shape of the cross section of the lenses in the direction perpendicular to their principal optic axes is a regular hexagon, the side length of the regular hexagon is 461.9 μm (0.4619 mm), and the opposite-side distance is 800 μm (0.800 mm).

In the fabrication of the lens unit, usually the substrate (for example, a glass substrate) is fabricated firstly, and subsequently the lens array is fabricated on the substrate. In order to protect the outmost lens, usually a certain space is left around the lens array. Referring to FIG. 15, a 0.50 mm-wide space is left between the edge lenses and the outmost periphery.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware including several different elements and by means of a properly programmed computer. In unit claims that list several devices, some of those devices may be embodied by the same item of hardware. The words first, second, third and so on do not denote any order. Those words may be interpreted as names.

The above are merely particular embodiments of the present disclosure, and the protection scope of the present disclosure is not limited thereto. All of the variations or substitutions that a person skilled in the art can easily envisage within the technical scope disclosed by the present disclosure should fall within the protection scope of the present disclosure. Therefore, the protection scope of the present disclosure should be subject to the protection scope of the claims.

The invention claimed is:

1. A device for optical-field displaying, wherein the device comprises: a display screen and a lens unit that is provided on a light exiting side of the display screen;
   the lens unit comprises a plurality of lenses that are arranged in an array;

the display screen is provided on a focal plane of the plurality of lenses;

the display screen comprises a first substrate and a second substrate that match;

the first substrate is a light-exiting-side substrate, the second substrate comprises a plurality of pixel islands that are arranged in an array, and each of the pixel islands comprises at least one sub-pixel;

the plurality of pixel islands correspond to the plurality of lenses; and a view region formed by light rays that are emitted by the sub-pixels of the pixel islands and propagated via the corresponding lenses to a human eye is smaller than or equal to a half-pupil region, and light rays of different viewpoints that are emitted by different sub-pixels of the pixel islands enter different cone cells via the lenses;

wherein the lenses are spherical lenses, and the plurality of lenses are closely arranged; and an aperture D of the lenses satisfies:

$$D \geq 2L\tan\left(\frac{N\varepsilon}{120}\right);$$

wherein L is an actual watching distance, N is a quantity of the viewpoints, N≥2, and ε is a human-eye limiting angle of resolution;

wherein the human-eye limiting angle of resolution ε=2', and the aperture D of the lenses satisfies:

$$D \geq 2L\tan\left(\frac{N}{60}\right)°;$$

wherein, a first watching distance $L_F$ satisfies:

$$\frac{a/2 + e/2}{\tan\omega} \leq L_F \leq \frac{\Phi f}{2p};$$

a focal length f of the lenses satisfies:

$$f = \frac{(a+e)p}{\Phi\tan\omega} + \frac{2ps}{\Phi};$$

and a placement height t of the lenses satisfies:

$$t=nf;$$

wherein a is a value of a side length of a longer side of the display screen, e is an interpupillary distance between human eyes, p is a pixel spacing of the display screen, Φ is a pupil diameter of a human eye, ω is a field angle of the lenses, s is a preset movable distance, and n is a refractive index of the lenses.

2. The device for optical-field displaying according to claim 1, wherein N=2, and a minimum value of the apertures of the lenses $$D\min = 2L\tan\left(\frac{1}{30}\right)°.$$

3. The device for optical-field displaying according to claim 1, wherein a shape of a visible space of the device for optical-field displaying is a circular truncated cone;

the circular truncated cone comprises a top circle and a bottom circle that are opposite, and the bottom circle is closer to the display screen than the top circle;

a diameter of the bottom circle is the interpupillary distance between human eyes, and is less than a diameter d of the top circle; and the diameter d of the top circle satisfies:

$$d = \frac{D\Phi}{Np};$$

wherein D is the aperture of the lenses, Φ is the pupil diameter of a human eye, and p is the pixel spacing of the display screen.

4. The device for optical-field displaying according to claim 3, wherein N=2, and the diameter d of the top circle satisfies:

$$d=D\Phi/2p.$$

5. The device for optical-field displaying according to claim 1, wherein a shape of a visible space of the device for optical-field displaying is a first circular truncated cone and a second circular truncated cone that are joined, wherein the first circular truncated cone is closer to the display screen than the second circular truncated cone;

the first circular truncated cone comprises a bottom circle and a joining circle that are opposite, and the second circular truncated cone comprises the joining circle and a top circle that are opposite;

a diameter of the bottom circle is the interpupillary distance e between human eyes, and is less than a diameter d of the top circle and a diameter d2 of the joining circle;

the diameter d of the top circle satisfies:

$$d = \frac{D\Phi}{2p};$$

the diameter d2 of the joining circle satisfies:

$$d2 = \frac{aD}{2f\tan\omega - D};$$

a height h1 of the first circular truncated cone satisfies:

$$h1 = \frac{af}{2f\tan\omega - D} - \frac{a+e}{2\tan\omega};$$

and a height h2 of the second circular truncated cone satisfies:

$$h2=s-h1;$$

wherein D is the aperture of the lenses, Φ is a pupil diameter of a human eye, p is a pixel spacing of the display screen, f is the focal length of the lenses, ω is a field angle of the lenses, a is the value of the side length of the longer side of the display screen, and s is a preset movable distance.

6. The device for optical-field displaying according to claim 1, wherein,
a second watching distance $L_M$ satisfies:

$$\frac{ef}{D} \le L_M < \frac{a+e}{2\tan\omega};$$

wherein a is the value of the side length of the longer side of the display screen, e is the interpupillary distance between human eyes, D is the aperture of the lenses, f is the focal length of the lenses, and ω is the field angle of the lenses.

7. The device for optical-field displaying according to claim 1, wherein,
a third watching distance $L_N$ satisfies:

$$L\min \le L_N < \frac{ef}{D};$$

wherein D is the aperture of the lenses, e is the interpupillary distance between human eyes, f is the focal length of the lenses, and Lmin is a minimum safe distance.

8. The device for optical-field displaying according to claim 7, wherein the minimum safe distance Lmin is 12 mm.

9. A device for optical-field displaying, wherein the device comprises: a display screen and a lens unit that is provided on a light exiting side of the display screen;
the lens unit comprises a plurality of lenses that are arranged in an array;
the display screen is provided on a focal plane of the plurality of lenses;
the display screen comprises a first substrate and a second substrate that match;
the first substrate is a light-exiting-side substrate, the second substrate comprises a plurality of pixel islands that are arranged in an array, and each of the pixel islands comprises at least one sub-pixel;
the plurality of pixel islands correspond to the plurality of lenses; and
a view region formed by light rays that are emitted by the sub-pixels of the pixel islands and propagated via the corresponding lenses to a human eye is smaller than or equal to a half-pupil region, and light rays of different viewpoints that are emitted by different sub-pixels of the pixel islands enter different cone cells via the lenses;

wherein a resolution PPD of an optical-field imaging system of the device for optical-field displaying satisfies:

$$PPD = \frac{L}{D} * \frac{\pi}{180};$$

wherein D is an aperture of the lenses, and L is an actual watching distance.

10. The device for optical-field displaying according to claim 1, wherein the focal lengths of the lenses are equal.

11. A device for optical-field displaying, wherein the device comprises: a display screen and a lens unit that is provided on a light exiting side of the display screen;
the lens unit comprises a plurality of lenses that are arranged in an array;
the display screen is provided on a focal plane of the plurality of lenses;
the display screen comprises a first substrate and a second substrate that match;
the first substrate is a light-exiting-side substrate, the second substrate comprises a plurality of pixel islands that are arranged in an array, and each of the pixel islands comprises at least one sub-pixel;
the plurality of pixel islands correspond to the plurality of lenses; and
a view region formed by light rays that are emitted by the sub-pixels of the pixel islands and propagated via the corresponding lenses to a human eye is smaller than or equal to a half-pupil region, and light rays of different viewpoints that are emitted by different sub-pixels of the pixel islands enter different cone cells via the lenses;
wherein the focal lengths of the lenses progressively increase in a first direction, wherein the first direction refers to a direction from a center position of the lens unit to an edge position of the lens unit.

12. The device for optical-field displaying according to claim 1, wherein the display screen is a liquid-crystal display screen, the first substrate is a color-film substrate, and the second substrate is an array substrate; or,
the display screen is an OLED display screen, the first substrate is a packaging substrate, and the second substrate is a displaying substrate of an OLED unit.

\* \* \* \* \*